United States Patent [19]

Georgian

[11] 4,243,213

[45] Jan. 6, 1981

[54] ADJUSTABLE PRECISION GRINDING AND MACHINIST VISE

[76] Inventor: Michael T. Georgian, 2554 Capitol, Warren, Mich. 48091

[21] Appl. No.: 4,546

[22] Filed: Jan. 18, 1979

[51] Int. Cl.³ .............................................. B23Q 3/04

[52] U.S. Cl. .................................... 269/137; 269/195; 269/902

[58] Field of Search ................ 269/134, 137, 194–195, 269/188, 189, 207, 212-215, 246, 283, 321 N, 165

[56] References Cited

U.S. PATENT DOCUMENTS

| | | | |
|---|---|---|---|
| 2,760,535 | 8/1956 | Mertz | 269/195 |
| 2,889,757 | 6/1959 | Cole | 269/165 |
| 2,948,172 | 8/1960 | Sloboda et al. | 269/283 |
| 2,992,665 | 7/1961 | Mertz | 269/195 |
| 4,078,782 | 3/1978 | Carlson | 269/283 |
| 4,138,100 | 2/1979 | Krummenacher | 269/137 |

*Primary Examiner*—Robert C. Watson
*Attorney, Agent, or Firm*—Remy J. VanOphem

[57] ABSTRACT

The invention concerns an adjustable precision grinding and machinist vise which has a novel mechanism for precisely clamping metal pieces, tools, and other articles between a movable jaw and a stationary jaw. The vise is made such that it can be mounted on larger machines such as lathes, drills, milling machines, surface grinders and the like. The device employs a series of notches in the base as a guide means to stabilize clamping. A pin engages, at its lower end, a guide with opposite flanges which guide also has a central wedge with an arcuate load bearing surface. The pin extends through a rotatable clamp disposed within an angling shoulder on the movable jaw. The pin is disposed through the movable jaw and into a chamber in the base for engagement in the guide means to thereby insure precise positioning. Threadably tightening the pin into the guide snugs either the arcuate upper surface of the wedge or the arcuate upper surface of the flanges, or both into engagement with an upper surface of the chamber in the base. The rotatable clamp and wedge (as well as flanges) allow rotation such that the movable jaw moves toward the stationary jaw of the vise upon tightening.

26 Claims, 6 Drawing Figures

ADJUSTABLE PRECISION GRINDING AND MACHINIST VISE

BACKGROUND OF THE INVENTION

1. Field of the Invention

This invention relates to vises and particularly vises for use in holding articles during machining operations so as to achieve a high degree of accuracy of machine work.

Vises in this field, although usually small, are quite heavy in order to effectively fix the position of a piece to be worked upon. The vises normally have a base, a jaw fixed to the base, and a movable jaw which slides into position. In the past, vises of this type have used various means for clamping an article to be machined within the vise. To date, these means have been ineffective to assure tolerances of 0.0002 inches. The vises customarily have a groove around the side or over the top, or both, for clamping the entire vise, with article to be machined therein, onto a drill or similar machine. Generally, the problem of tolerances does not involve holding the vise on the machine.

2. Description of the Prior Art

Many devices have been invented in the past to provide accurate machine tolerances.

Beusch, in U.S. Pat. No. 2,803,999, describes a device with handles which tighten a movable jaw into position against a stationary jaw. Similarly, Paret, in U.S. Pat. No. 3,630,512, describes a device which uses a screw that turns by a key in the screw head to make a fine adjustment in the vise. Graether, in U.S. Pat. No. 2,511,843 shows a vise with both a stationary and a movable jaw. Graether uses a screw shaft with a hand wheel thereon for tightening the jaws together. Also known is Renner, U.S. Pat. No. 2,552,738. Renner uses a nut on a threaded shank in order to tighten the jaws of the small vise together. Renner uses a threaded member and a threaded bore within the base of the vise for cooperation to achieve a locking/holding effect for a shank, whereby the jaws are moved together upon tightening of the nut on the shank.

To date, none of these devices or similar devices have been able to consistently achieve the tolerences required, such as 0.0002 inches.

SUMMARY OF THE INVENTION

To solve the above problems, a vise is provided to hold pieces fast within the vise while the vise itself can be placed and locked onto a machine for drilling and the like. The novelty of the device which effects the accuracy required of such items in the industry is a specially provided chamber within the base of the vise, which chamber works in cooperation with a pin disposed through the movable jaw and into the chamber of the vise. The movable jaw of the vise is provided with an angling surface which surface has a depression therein and from which a bore is provided through the movable jaw. A rotatable swivel clamp or equivalent is inserted into the depression in the angling surface of the movable jaw. The pin, usually a socket head clamp screw, is positioned through the movable jaw and is threaded through a flanged guide. The lower extremity of the pin thereby engages the guide with two opposite arcuate flanges extending laterally from the pin and a chamfered semicylinder or wedge. The flanges engage notched positions in the base chamber. The chamfered wedge has an upper arcuate (not necessarily circular) surface which rotates against the top of the chamber in the base (below the top surface of the base). The arcuate surface of the wedge is designed to insure maximum force exerted to slide the movable jaw into locking position. When the socket head clamp screw or equivalent mechanism is loosened sufficiently, the pin and flanged guide may be dropped down somewhat, slid longitudinally somewhat, and then lifted back up into an adjacent notch within the chamber of the base.

The guide may be moved from one notch to the next without removing the vise from its clamped position on a machine. The guide will not become completely unthreaded from the pin because a securing bar such as a brass cotter pin is pegged and spread through a hole in the bottom of the threaded pin. This can save valuable set up time.

The notches are arranged in a corduroy fashion from one end of the base of the vise to the other end. These laterally extending notches, each pair of which match the flanges of the pin, need not extend completely across the base of the vise but only sufficiently to accommodate the flanges of the pin since minimum notch width limits temperature distortions and thereby increases accuracy. As can be seen in the drawings which follow, the flanges and their cooperating notches are wider than the wedge/chamfered semicylinder, which is, in turn, wider than the shaft of the pin. Similarly, the chamber in the base of the vise goes (from top to bottom) from a narrow entrance at the top surface of the base to a wider portion to accommodate the wedge to an even wider portion to accommodate the flanges. Preferably, the wedge is chamfered on the bottom to require only a minimum depth below the notches for movement of the pin from one notch to another. Alternatively, the wedge may be a complete semi-cylinder, or for that matter a full cylinder, but then a deeper base is required in order that the semi-cylinder shaped wedge may pass below the surface formed between the notches in the base without extending out through the base of the vise. If this alternative is used, then the weight of the vise is increased considerably due to the increased depth of the base element metal. Of course, for uses that do not require the guide to stay within the base during loosening, the base may be shallow despite the shape of the guide. This is uncommon, however.

OBJECTS OF THE PRESENT INVENTION

It is an object of the present invention to provide a vise for use on machines, which vise accurately holds items in place for drilling, cutting, and the like. It is also an object of this invention to provide an easily manufactured vise which will hold tolerance accuracy over a period of time despite temperature changes, magnetic fields, use, and abuse. These and other objects of the invention will become clear to one skilled in the art from the descriptions given below.

DESCRIPTION OF THE PREFERRED EMBODIMENT

Figure 1:
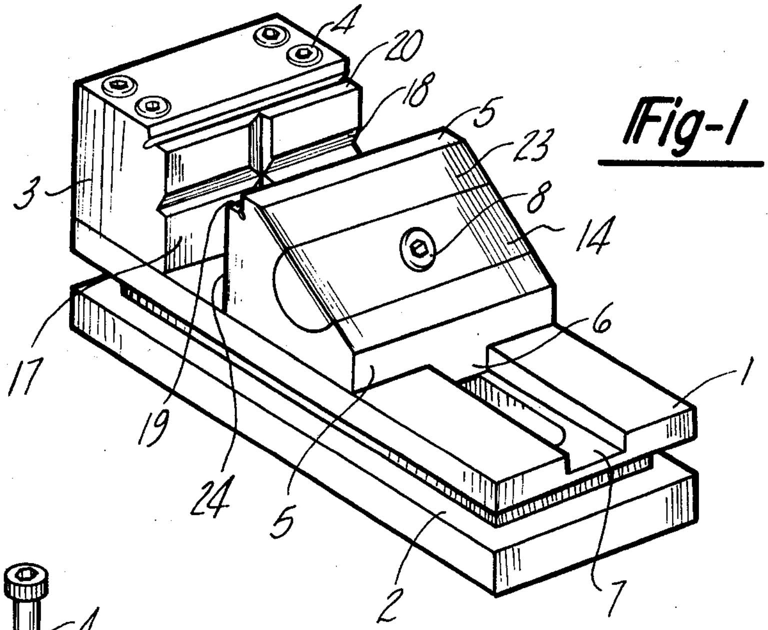
FIG. 1 shows a perspective view of the assembled vise.
Figure 2:
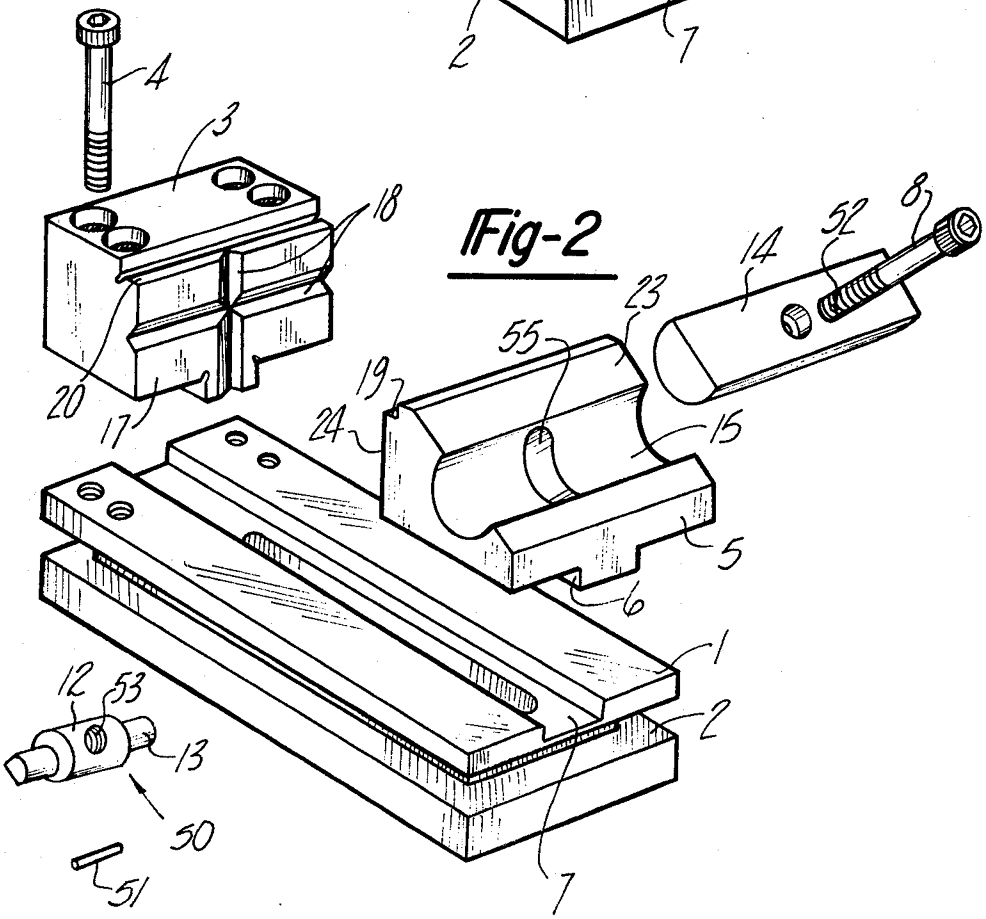
FIG. 2 shows an exploded view of the disassembled vise.
Figure 6:
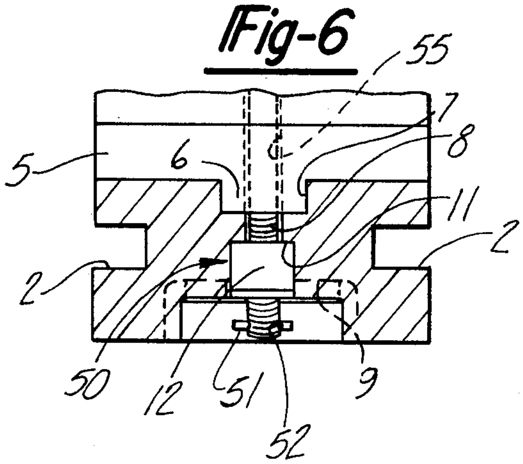
FIG. 6 shows a partial end view of the base of the vice, formed for a wedge and flange guide, locking in the direction of arrows 6—6 in FIG. 4.

FIGS. 1 and 2 show the vise with base element 1 which is provided with channelled surfaces 2 on its edges so that the vise may be locked into a larger machine. The stationary jaw 3 is mounted at one end or alternatively may be formed integrally with the base. If the stationary jaw is not integral with the base, then it can be suitably mounted, for example, with socket head screws 4. The movable jaw 5 is mounted on the base element 1 by sliding extension 6, also shown in FIG. 6, into the groove 7 of the base element 1.

Figure 3:
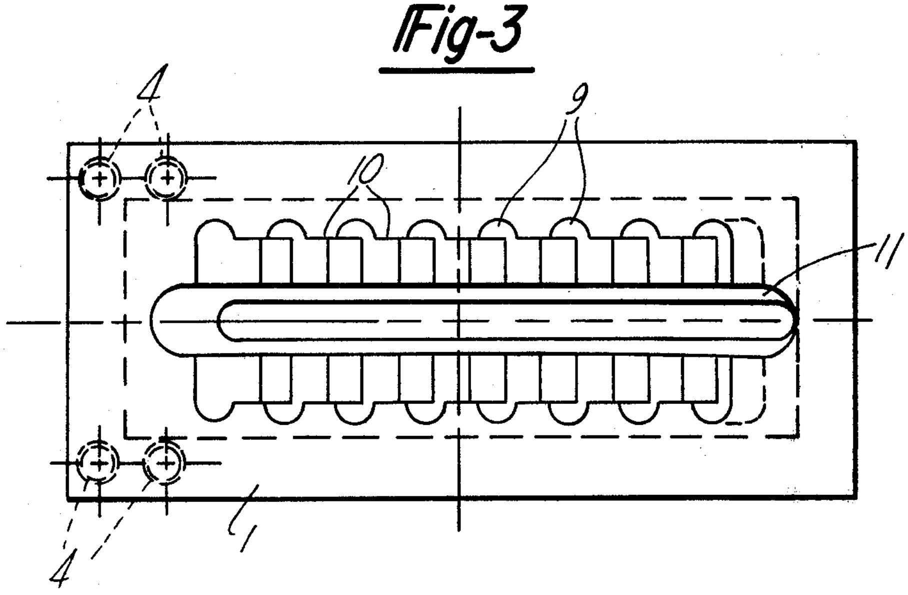
FIG. 3 shows a bottom view of the base of the vise.
Figure 4:
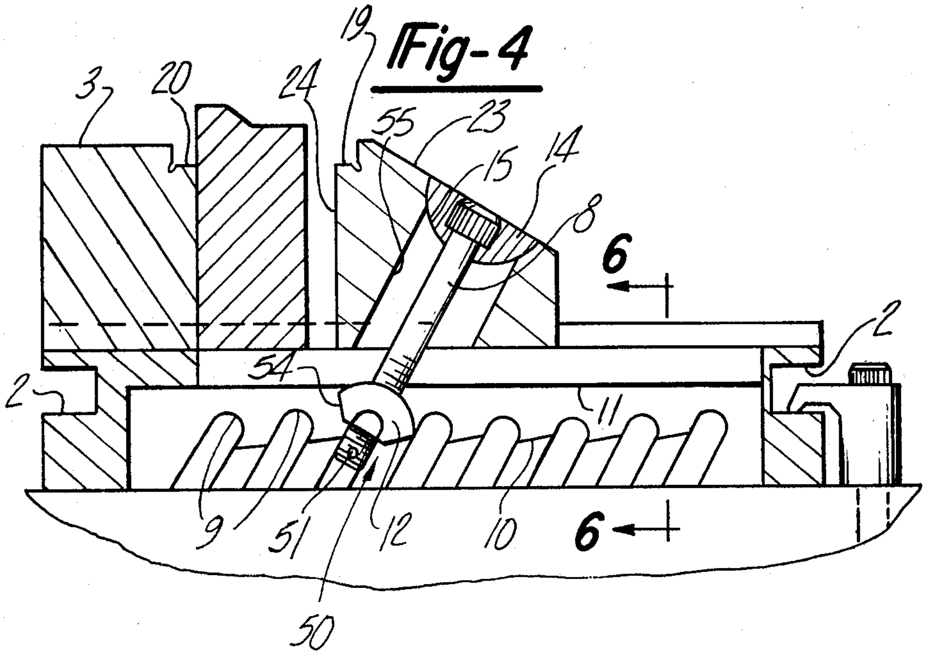
FIG. 4 shows a partial sectional side view of the assembled vise, clamped to a machine.

As shown in FIGS. 3 and 4, the base element has formed therein a multiple part chamber for engagement of a pin 8. The chamber in the base 1 has a plurality of arcuate, angling notches 9 forming a corduroy surface within the base 1. Lower flat surfaces 10 are formed between the corduroy notches 9.

Figure 5:
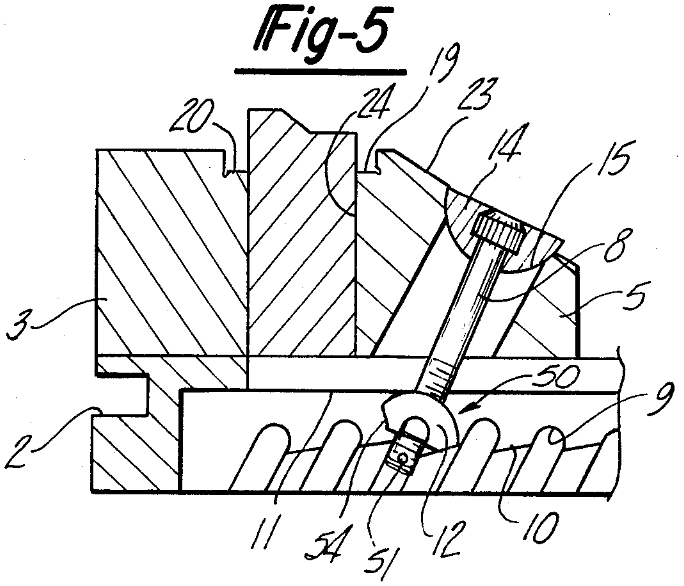
FIG. 5 shows a partial sectional side view of the vise with the jaws engaging a work piece.

Above the surfaces 9 and 10, there is formed a surface 11 for engagement of an arcuately surfaced wedge 12 formed on the guide 50 which engages the pin 8, as readily shown in the side view of FIG. 5. The flanges 13, shown in FIG. 2, engage the notches 9 shown in FIGS. 3, 4, and 5.

A semicylindrical swivel clamp 14 as shown in FIG. 2, is disposed upon an indented surface 15. The pin 8 is inserted through the swivel clamp 14 and the movable jaw 5, and then into the base element 1. The pin 8 is then threadably engaged in the guide 50, and the cotter pin 51 is secured through the hole 53 in the bottom of pin 8. The semicylindrical swivel clamp may extend either partially or completely across the movable jaw 5.

The notches 9 in the base 1 need not be formed completely across the base 1 since otherwise too much variance from temperature changes could occur, thereby defeating the accuracy of the vise.

Crossed "V" depressions are formed preferably on the stationary jaw face 17. The V's 18 are about ¼" deep in the face of the stationary jaw 3. The V's 18 help to hold many shapes of metal and stock clamped in the vise, often round stock. Alternatively, the V's may be formed on the movable jaw; but this may lead to a build-up of grime or foreign material within the etching since the movable jaw is more commonly handled. The V's are preferably vertical and horizontal with the horizontal V being parallel to the base.

It should also be noted that the guide 50, shown in FIG. 2, may be formed without the wedge or chamfered arcuate member 12 integrally thereon. Alternatively, it may be formed with simply larger flanges such that the upper surface of the flange 13 is arcuate to cooperate with the arcuate corduroy notches 9 for rotation. This, however, would mean that fewer notches could be provided and, with certain large size flanges, the vise may not be usable with all widths of work pieces. Also, the base element 1 would be more costly, since each notch would have to be machined to the tolerance required of the arcuate flange surface 13.

If the chamber is formed so that the last notch is near the end of the base opposite the stationary jaw, then the movable jaw may be moved to its complete extremity, almost out of the base 1 to afford a maximum size for holding an item in the vise. Thus, the invention by its novel guide means, can hold larger items than heretofore usable in similar vises where a hand screw tightening means limited expansion of the vise.

Both the movable jaw 5 and the stationary jaw 3 are provided with notches 19 and 20, respectively, at their tops. Therefore, when a small item is held in the vise these notches provide surfaces on the movable jaw 5 and on the stationary jaw 3 so as to allow clamping of the entire vise onto a machine.

Large machines such as a surface grinder sometimes use a magnetic chuck for holding pieces. However, these machines adversely affect the tightening/gripping means unless such means is made from metal such as brass, copper, bronze, aluminum, or nonmagnetic stainless steel. The present device provides an effective means for holding such metals in coordination with the magnetic device of such larger machines. Specifically, the socket head clamp screw 8, the guide 50, and the swivel clamp 14 are all formed of stainless steel, bronze, or the like so as to be unaffected by magnetic force when the vise and metal piece are held on a machine by magnetic means. By provision of these nonmagnetic elements, the adjustment of the vise is unaffected by the magnetic means and the exact tolerances required are accurately achieved.

The socket head of the socket head clamp screw (pin) 8 is preferably counterbore into the half moon/-semicylindrical swivel clamp 14. This means that the socket head clamp screw 8 is less likely to be bumped or otherwise affected when the work piece is secured in the vise. The slanting surface 23 on the movable jaw 5 is preferably at about 45 degrees relative to both the top surface of the base 1 as well as to the face 24 of movable jaw 5 and face 17 of stationary jaw 3.

In an alternative embodiment, the pin 8 may be integrally formed with the guide 50 and is threaded at its top so as to engage a threaded nut on the shoulder 23. With this embodiment, the bottom of the base must be open and the pin first inserted from the bottom, up through the base 1, movable jaw 5, and swivel clamp 14 before tightening the nut.

OPERATION

The movable jaw has a forward and downward motion toward the stationary jaw. There is no need to regrind the parts of the vise when wear occurs since the pin may simply be tightened further to achieve the same position as before the wear.

The pin 8 positioned through the swivel clamp 14 and movable jaw 5, engages the guide means 50 such that arcuate wedge 12 aligns for rotation on the surface 11 near the top of base 1. Likewise, the flanges 13 align in any pair of transverse notches 9 for rotation therein. At this point, the pin is still loose enough to be dropped somewhat so as to bump it below surfaces 10 into another pair of notches 9. If the wedge 12 has chamfered edges 54 as shown in FIGS. 4 and 5, then the guide 50 and pin 8 may be loosened and easily bumped into another notch without extending below the base 1. Otherwise, the base would have to be deeper and, therefore, heavier. The brass cotter pin 51 keeps the pin 8 from completely unthreading guide 50 while loosening the vise. Therefore, once the vise has been set into a large machine according to precision tolerances, the laborious set up time is not lost due to pin disengagement which would require dismantling of the vise from the larger machine. Once the appropriate notch is found, depending upon the size of the work piece to be secured, then the socket head clamp screw (or pin) 8 can be threaded tightly with an appropriate tool, such as an Allen wrench, thereby moving the movable jaw 5 forward and down to tightly engage the work piece. Note that during the tightening of the socket head clamp screw 8, swivel clamp 14, due to its half moon shape, rotates on a surface 15. Also, either arcuately surfaced wedge member 12 rotates on upper surface 11 or arcuately surfaced flanges 13 rotate within the notches 9, or both. If the guide 50 is formed without the wedge member or such that wedge member 12 and flanges 13 comprise one element, then, of course, there is only one arcuate surface to rotate on an upper surface within the notches 9.

The notches extend from a top surface in an angular direction just as the slot 55 through the movable jaw 5 is formed in an angular direction perpendicular to the face 23. If the notches 9 do not extend completely to the bottom of the base 1 as they do in FIG. 3, then the device may be unnecessarily heavy although this is allowable for many uses of the vise.

Provided that the notches 9 are properly sized and spaced, then any given size workpiece (which is capable of being held in the vise) may be secured in the vise with the lateral flanges 13 of the guide 50 in either of two pairs of adjacent transverse notches 9. This is attributable to the length of the socket head screw and the width of the bore 55 through the movable jaw. The swivel clamp is more horizontal when it is in the more forward of a pair of such notches and the clamp is rotated to a more vertical position when the flanges are in the more rearward notches. Of course, better gripping of the jaws is given by a greater forward force exerted on the movable jaw. This means that the vise is more effective when the guide is in the pair of notches closest to the end with the stationary jaw so that the pin is inclined more toward the horizontal.

Another important aspect of the operation of the present invention is that regrinding is not required when the vise wears. Additional tightening compensates for wear.

Having described my invention, it will be apparent to those skilled in the art that it is possible to make slight changes in the design of the preferred embodiment as described herein or to otherwise vary the parts of the device without departing from the scope or spirit of the invention as claimed herein.

Therefore, what is claimed is:

1. An adjustable precision machinist vise comprising:

a base having a flat top, a flat parallel bottom opposite said flat top, a first end disposed at one end of said base, a second end disposed laterally opposite said first end, and guide means formed in said top of said base, said guide means comprising:

a first central slot portion with a predetermined width formed in said top of said base said first slot portion further extending longitudinally across said flat top and penetrating said top a first predetermined depth from said flat top toward said bottom;

a second central slot portion centrally located with said first central slot, said second slot portion further being wider than said predetermined width of said first portion and penetrating a second predetermined depth from said bottom toward said top of said base to intersect said first central slot portion, said second slot portion further extending longitudinally in said base coaxially with said first central slot;

a first parallel lateral longitudinal plane formed at the intersection of said first central slot portion with said second central slot portion; and a second flat lateral plane centrally located in said base with said first flat lateral plane, said second plane further being wider than said first flat lateral plane and penetrating said bottom a third predetermined depth which is less than said second predetermined depth for communication with said first flat lateral plane, said second flat lateral plane further having a plurality of lateral notches formed therein, said notches further forming a corrugated surface in said second flat lateral plane;

a stationary jaw fixedly mounted on said top of said base and adjacent to said first end of said base, said stationary jaw having a flat face perpendicular to said flat top and said flat face further being disposed facing said second end;

a movable jaw mounted on said top of said base and spanning said first slot, said movable jaw having an opposing flat surface disposed opposite to said flat face for cooperation with said flat face of said stationary jaw, an inclined shoulder on the top of said movable jaw slanting down from said opposing flat surface toward said second end of said base, a semi-cylindrical hollow surface formed laterally in said shoulder and an angling slot formed in said hollow surface, said angling slot further being inclined relative to said opposing flat surface and directed toward said first end through said movable jaw;

a swivel clamp mounted to said movable jaw, said clamp having a flat side and an arcuate side opposite said flat side for cooperative engagement with said semi-cylindrical hollow surface, said clamp further having a hole formed through said clamp and extending from said flat side through said arcuate side for communication with said angling slot in said movable jaw, said clamp further having a bore counterbored about said hole in said flat side;

a guide element mounted adjacent to said first flat lateral parallel plane, said guide element having a wedge portion, a first flange extending laterally of said wedge portion and a second flange etending laterally of said wedge portion opposite to said first flange, said first and second flanges having upper arcuate surfaces for cooperative engagement with said corrugated surface, said wedge portion having thread means and an upper arcuate surface for clamping engagement against said first flat lateral parallel plane; and a latching pin disposed through said hole in said swivel clamp, through said angling slot in said movable jaw, through said guide means in said base to threadably engage said thread means in said wedge portion such that when said pin is threadably tightened said first and second flanges are positioned in one of said plurality of notches in said corrugated surface to clamp said upper arcuate surface of said wedge portion against said first flat lateral parallel plane in said base in order to locate said movable jaw on said flat top relative to said stationary jaw along said first slot portion in said top and such that when said pin is threadably loosened, said first and second flanges are adapted to be positioned in another of said plurality of notches in said corrugated surface in order to locate said movable jaw relative to said stationary jaw along the full longitudinal range of said first slot portion.

2. An adjustable precision machinist vise comprising:

a base having a first end, a second end disposed opposite to said first end, a flat top interposed said first and second end, a bottom parallel plane opposite said flat top and guide means formed in said top of said base, said guide means comprising:

a first central slot portion with a predetermined width formed in said top of said base, said first slot portion further extending a predetermined longitudinal distance across said flat top and penetrating said top a first predetermined depth from said flat top toward said bottom;

a second slot portion centrally located in said base with said first slot portion, said second slot portion further being wider than said predetermined width of said first portion and penetrating a second depth from said bottom toward said top of said base to intersect said first central slot portion; said second slot portion further extending longitudinally in said base coaxially with said first central slot;

a first flat parallel lateral longitudinal plane formed at the intersection of said first central slot portion with said second central slot portion; and a second flat parallel plane centrally located in said base with said first flat lateral parallel plane, said second plane further being wider than said first plane and penetrating said bottom a third predetermined depth which is less than said second depth for communication with said first plane, said second plane further having a plurality of lateral notches formed therein, said notches further forming a corrugated surface in said second flat lateral parallel plane;

a stationary jaw mounted to said flat top and adjacent to said first end of said base;

a movable jaw slidably mounted on said top of said base and disposed opposite to said stationary jaw for cooperation therewith, said movable jaw having an inclined shoulder on the top of said movable jaw; said shoulder inclined relative to said flat top and directed slanting down from said first end of said base toward said second end of said base and an angling slot formed in said shoulder and inclined relative to said flat top and directed toward said first end through said movable jaw;

swivel means mounted in spaced relationship to said inclined shoulder of said movable jaw, said swivel means having a hole therethrough;

a pin disposed through said hole in swivel means, through said angling slot in said movable jaw, and through said first and second slot portions;

a guided element mounted adjacent to said second slot, said guide element having a wedge portion, a first flange extending laterally of said wedge portion and a second flange extending laterally of said wedge portion opposite to said first flange, said first and second flanges having upper arcuate surfaces for cooperative engagement with said corrugated surface, said wedge portion having an upper arcuate surface for cooperative engagement against said first flat parallel plane; and means for engaging said pin to said guided element such that when said means for engaging is tightened, said first and second lateral flanges are positioned in one of said plurality of notches in said corrugated surface to clamp said upper arcuate surface of said wedge portion against said first plane in order to locate said movable jaw relative to said stationary jaw longitudinally along said first slot in said top of said base and such that when said means for engaging is loosened said first and second flanges are adapted to be positioned in another of said notches in order to locate said movable jaw relative to said stationary jaw along the full longitudinal range of said first slot portion.

3. The precision vise of claim 2 wherein said stationary jaw is fixedly mounted on said top of said first end of said base.

4. The precision vise of claim 3 wherein said stationary jaw is threadably mounted to said top of said base.

5. The precision vise of claim 2 wherein said stationary jaw has a flat face and said movable jaw has a flat surface opposite said flat face and disposed parallel thereto.

6. The precision vise of claim 5 wherein said base has a flat top, said movable jaw and said stationary jaw are slidably mounted on said flat top, and said flat face is perpendicular to said top of said base.

7. The precision vise of claim 2 wherein said stationary jaw has a face with at least one "V" slot inscribed thereon for gripping items.

8. The precision vise of claim 2 wherein said movable jaw has a surface with at least one "V" slot inscribed thereon for gripping items.

9. The precision vise of claim 6 wherein said face has two mutually perpendicular "V" slots inscribed thereon for gripping items.

10. The precision vise of claim 6 wherein said surface has two mutually perpendicular "V" slots inscribed thereon for gripping items.

11. The precision a vise of claim 2 wherein said tightening means comprises said pin in threaded engagement with said guided element.

12. The precision vise of claim 11 wherein said pin is a socket head clamp screw.

13. The precision vise of claim 2 wherein:

said movable jaw further comprises:

an arcuate hollow surface formed laterally in said shoulder;

a slot formed in said hollow surface, said slot further being inclined relative to said flat top and directed toward said first end through said movable jaw; and said swivel means further comprises:

an arcuate member mounted in said arcuate hollow surface for cooperative engagement with said hollow surface, said arcuate member having a hole therethrough which communicates with said slot; and said pin further being disposed through said hole and through said slot.

14. The precision vise of claim 13 wherein said slot is inclined relative to said movable jaw and perpendicular to said shoulder.

15. The precision vise of claim 13 wherein said arcuate hollow surface is a semi-cylindrical hollow surface and said arcuate member having an arcuate side and a flat surface opposite said flat side, said arcuate side further being mounted in cooperative engagement with said surface.

16. The precision vise of claim 15 wherein said arcuate member is a swivel clamp.

17. The precision vise of claim 15 wherein said coupling means further comprises said pin threadably engaged to said guided elements.

18. The precision vise of claim 17 wherein said pin is a socket head clamp screw.

19. The precision vise of claim 15 wherein said arcuate member extends laterally across said shoulder.

20. The precision vise of claim 2 wherein said wedge section has a chamfered lower section.

21. The precision vise of claim 2 wherein said base has a perimeter with at least one groove formed thereon for clamping.

22. The precision vise of claim 2 wherein said movable jaw is notched and said stationary jaw is notched such that a groove is formed therebetween.

23. The precision vise of claim 6 wherein said shoulder is inclined at an angle of 45° degrees to said flat top.

24. The precision vise of claim 2 wherein said pin, said swivel means, and said coupling means are non-magnetic.

25. The precision vise of claim 2 wherein, said pin has a threaded tip, and said coupling means further comprises a threaded nut engaging said pin at said threaded tip.

26. The precision vise of claim 2, wherein said pin has a hole formed through said tip, and further comprising a bar fixedly disposed through said hole such that said pin will not become disengaged from said guided means when said coupling means is loosened.

* * * * *

UNITED STATES PATENT OFFICE
CERTIFICATE OF CORRECTION

Patent No. 4,243,213 Dated January 6, 1981

Inventor(s) Michael T. Georgian

It is certified that error appears in the above-identified patent and that said Letters Patent are hereby corrected as shown below:

Column 6, line 43, lelete the word "etending" and insert ----extending----.

Column 8, line 34, after the word "precision" delete the word "a".

Signed and Sealed this

*First* Day of *September 1981*

[SEAL]

*Attest:*

GERALD J. MOSSINGHOFF

*Attesting Officer* *Commissioner of Patents and Trademarks*